(12) United States Patent
Rixner et al.

(10) Patent No.: US 7,818,539 B2
(45) Date of Patent: *Oct. 19, 2010

(54) SYSTEM AND METHOD FOR PERFORMING EFFICIENT CONDITIONAL VECTOR OPERATIONS FOR DATA PARALLEL ARCHITECTURES INVOLVING BOTH INPUT AND CONDITIONAL VECTOR VALUES

(75) Inventors: Scott Rixner, Spring, TX (US); John D. Owens, Emeryville, CA (US); Ujval J. Kapasi, Santa Clara, CA (US); William J. Dally, Stanford, CA (US)

(73) Assignees: The Board of Trustees of the Leland Stanford Junior University, Palo Alto, CA (US); The Massachusetts Institute of Technology, Cambridge, MA (US)

( * ) Notice: Subject to any disclaimer, the term of this patent is extended or adjusted under 35 U.S.C. 154(b) by 877 days.

This patent is subject to a terminal disclaimer.

(21) Appl. No.: 11/511,157

(22) Filed: Aug. 28, 2006

(65) Prior Publication Data

US 2007/0150700 A1 Jun. 28, 2007

Related U.S. Application Data

(63) Continuation of application No. 09/871,301, filed on May 30, 2001, now Pat. No. 7,100,026, which is a continuation-in-part of application No. 09/152,944, filed on Sep. 14, 1998, now Pat. No. 6,269,435.

(51) Int. Cl.
*G06F 15/00* (2006.01)
*G06F 15/76* (2006.01)

(52) U.S. Cl. .................... 712/20; 712/4; 712/8; 712/22; 712/222

(58) Field of Classification Search ..................... 712/20
See application file for complete search history.

(56) References Cited

U.S. PATENT DOCUMENTS 4,881,168 A 11/1989 Inagami et al.

(Continued)

OTHER PUBLICATIONS

Cormen et al. "Introduction to Algorithms (MIT Electrical Engineering and Computer Science Series)." *MIT Press*, ISBN 0262031418, pp. 665-667 and 695-697, 1990.
Kapasi et al. "Efficient Conditional Operations for Data-parallel Architectures." *Computer Systems Laboratory*, Stanford University, 2000.

*Primary Examiner*—Alford W Kindred
*Assistant Examiner*—Brooke J Dews
(74) *Attorney, Agent, or Firm*—Crawford Maunu PLLC

(57) ABSTRACT

A processor implements conditional vector operations in which, for example, an input vector containing multiple operands to be used in conditional operations is divided into two or more output vectors based on a condition vector. Each output vector can then be processed at full processor efficiency without cycles wasted due to branch latency. Data to be processed are divided into two groups based on whether or not they satisfy a given condition by e.g., steering each to one of the two index vectors. Once the data have been segregated in this way, subsequent processing can be performed without conditional operations, processor cycles wasted due to branch latency, incorrect speculation or execution of unnecessary instructions due to predication. Other examples of conditional operations include combining one or more input vectors into a single output vector based on a condition vector, conditional vector switching, conditional vector combining, and conditional vector load balancing.

3 Claims, 11 Drawing Sheets

U.S. PATENT DOCUMENTS

| | | |
|---|---|---|
| 5,553,309 A | 9/1996 | Asai et al. |
| 5,604,913 A | 2/1997 | Koyanagi et al. |
| 5,678,058 A | 10/1997 | Sato |
| 5,825,677 A | 10/1998 | Agarwal et al. |
| 5,907,842 A | 5/1999 | Mennemeier et al. |
| 5,909,572 A | 6/1999 | Thayer et al. |
| 6,058,465 A | 5/2000 | Nguyen |
| 7,401,204 B1 * | 7/2008 | Miyake et al. ......... 712/22 |

* cited by examiner

5x5 foreground

5x5 background

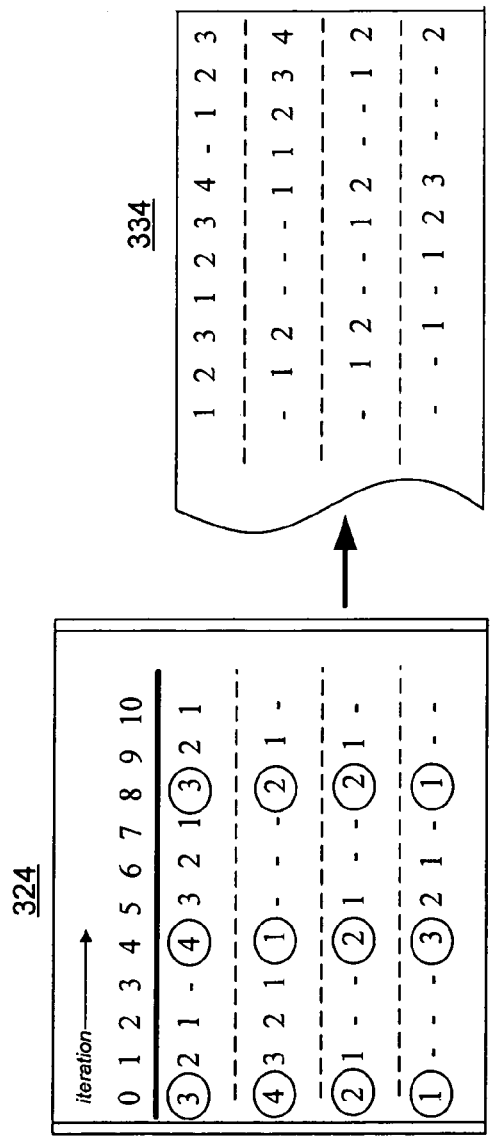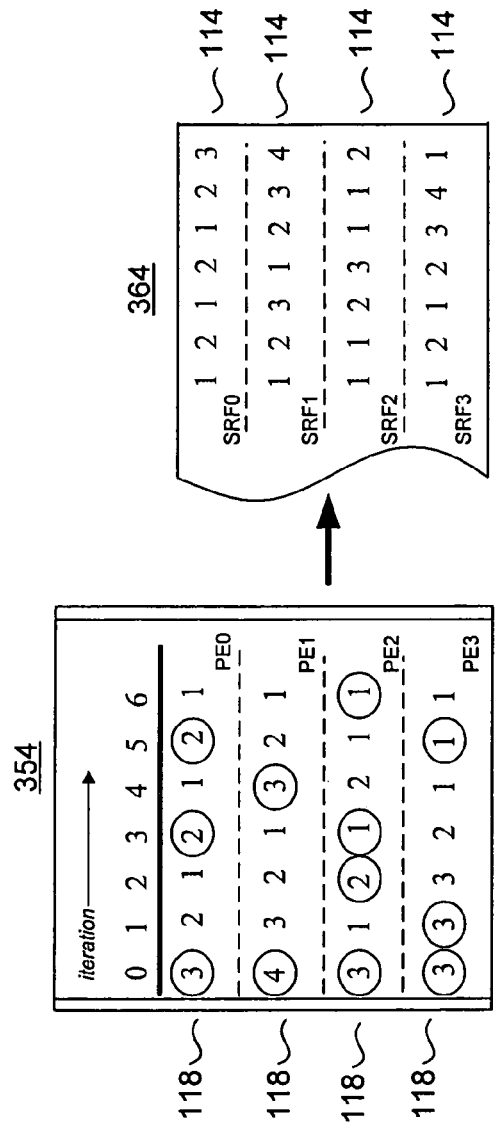
FIG. 9A
FIG. 9B

SYSTEM AND METHOD FOR PERFORMING EFFICIENT CONDITIONAL VECTOR OPERATIONS FOR DATA PARALLEL ARCHITECTURES INVOLVING BOTH INPUT AND CONDITIONAL VECTOR VALUES

RELATED PATENT DOCUMENTS

This application is a continuation of U.S. patent application Ser. No. 09/871,301 filed on May 30, 2001, to issue as U.S. Pat. No. 7,100,026 on Aug. 29, 2006; which is further a continuation-in-part of U.S. patent application Ser. No. 09/152,944 filed on Sep. 14, 1998, now U.S. Pat. No. 6,269,435 to which priority is claimed under 35 U.S.C. §120.

FEDERALLY SPONSORED RESEARCH OR DEVELOPMENT

This invention was made with government support under Grant Number DATB63-96-C-0037 awarded by the U.S. Army. The government has certain rights in this invention.

FIELD OF THE INVENTION

The present invention is directed to computer architectures. More specifically, the invention is directed to pipelined and parallel processing computer systems which are designed to efficiently perform conditional processing operations using a large number of operational units and pipelines.

BACKGROUND

Providing adequate instruction and data bandwidth is a key problem in modern computer systems. In a conventional scalar architecture, each arithmetic operation, e.g., an addition or multiplication, requires one word of instruction bandwidth to control the operation and three words of data bandwidth to provide the input data and to consume the result (two words for the operands and one word for the result). Thus the raw bandwidth demand is four words per operation. Conventional architectures use a storage hierarchy consisting of register files and cache memories to provide much of this bandwidth; however, since arithmetic bandwidth scales with advances in technology, providing this instruction and data bandwidth at each level of the memory hierarchy, particularly the bottom, is a challenging problem.

Vector architectures have emerged as one approach to reducing the instruction bandwidth required for a computation. With conventional vector architectures, e.g., the Cray-1, a single instruction word specifies a sequence of arithmetic operations, one on each element of a vector of inputs. For example, a vector addition instruction VADD VA, VB, VC causes each element of an, e.g., sixty-four element vector VA to be added to the corresponding element of a vector VB with the result being placed in the corresponding element of vector VC. Thus, to the extent that the computation being performed can be expressed in terms of vector operations, a vector architecture reduces the required instruction bandwidth by a factor of the vector length (sixty-four in the case of the Cray-1).

While vector architectures may alleviate some of the instruction bandwidth requirements, data bandwidth demands remain undiminished. Each arithmetic operation still requires three words of data bandwidth from a global storage source shared by all arithmetic units. In most vector architectures, this global storage resource is the vector register file. As the number of arithmetic units is increased, this register file becomes a bottleneck that limits further improvements in machine performance.

To reduce the latency of arithmetic operations, some vector architectures perform "chaining" of arithmetic operations. For example, consider performing the above vector addition operation and then performing the vector multiplication operation VMUL VC VD VE using the result. With chaining, the vector multiply instruction consumes the elements computed by the vector add instruction in VC as they are produced and without waiting for the entire vector add instruction to complete. Chaining, however, also does not diminish the demand for data bandwidth—each arithmetic operation still requires three words of bandwidth from the vector register file.

Another latency problem arises in connection with conditional operations, i.e., operations in which the result is dependent on the result of a Boolean or multi-valued test on input data. For example, when sorting several values, two values are compared and, depending on whether the first is greater than, less than or equal to the second value, different actions may be taken.

As another example, consider chroma-keying a video signal. Chroma-keying is used to, e.g., superimpose one video stream representing a foreground object such as a television weather person on another video stream representing a background object such as a map. The foreground object is typically photographed against a blue or other fixed color background to facilitate separation of the object from its background based on color or chrominance. Using a C-like pseudocode, this process can be described by

```
for each pixel p[i] {
    read foreground pixel pf[i] from foreground stream;
    read background pixel pb[i] from background stream;
    if (pf[i] is blue) {
        p[i] = pb[i];
        do background processing; }
    else {
        p[i] = pf[i];
        do foreground processing; }
    output p[i] to output stream; }
```

Since subsequent program execution may involve completely different data or completely different operations depending on the outcome of the comparison, execution generally halts until the result of the conditional operation is known, thereby serializing the program flow and lowering the performance of parallel processing systems.

In the above example, processing will proceed (using parallel operations if supported by the processor) until it encounters the conditional portion of the if-else statement, at which time it stops and waits for the conditional expression to be evaluated. The time, e.g., in clock cycles, from the time the condition is tested until the first instruction at the chosen branch destination is executed is called the branch latency of the instruction. Contemporary pipelined processors typically have a branch latency of about four cycles.

As noted above, during the branch latency period all functional units of the processor are idle. Since modern processors often have multiple functional units, the number of wasted processor cycles can be multiplied several times over, and this problem can be compounded by pipelining, another feature common to most modern microprocessors. In a pipelined processor having five functional units, for example, twenty instruction issue opportunities are lost to a conditional operation having a four cycle branch latency.

This problem can be ameliorated somewhat by employing a technique called speculation or branch prediction to avoid waiting for the result of a comparison. In this technique the processor guesses an outcome for the branch, i.e., whether it is taken and execution jumps or it is not taken and execution proceeds in sequence, and begins executing instructions corresponding to the chosen outcome. Once the true outcome of the conditional operation is known, the results generated by the speculation are confirmed and execution proceeds if the speculative outcome was the correct one, or the results are flushed from the pipeline if the speculation was incorrect.

For example, in the chroma-keying example shown above, when reaching the conditional expression the processor might speculate that the pixel will indeed be blue (since the area of the background is usually larger than that of the foreground subject, this will more often than not be true) and proceed to execute the corresponding branch.

Speculation works well on branches that almost always go one way, e.g., error checks or checks for exceptional conditions, and branches that occur in repeatable patterns, e.g., the return branch at the end of an iterative loop. It does not yield good results on unbiased, highly data-dependent branches and, given completely random data, will guess correctly only 50% of the time (note, however, that this still represents a 50% usage of otherwise dead branch latency cycles).

Another technique designed to work around branch latency effects is predication (sometimes called a select or a masked vector operation in single instruction, multiple data (SIMD) and vector processors), in which instructions from both sides of a branch are executed and, when the actual comparison outcome is known, only the results generated by the correct branch are retained. For example, returning to our chroma-keying example, program execution would proceed to execute instructions for background processing and instructions for foreground processing and, if the pixel in question is found to be blue, the results corresponding to foreground processing would be deleted. Predication is necessarily limited to an efficiency of 50% compared to normal execution, since half the instructions executed will always be incorrect. Further, if comparisons are nested so that more than two outcomes are possible, the maximum efficiency of the technique is correspondingly reduced (of course, the efficiency of speculation also decreases with an increase in possible comparison outcomes).

SUMMARY

In view of the above problems of the prior art, it is an object of the present invention to provide a data processing system and method which can provide a high level of productive processor cycle usage.

The above objects are achieved according to a first aspect of the present invention by providing a processor implementing conditional vector operations. In an exemplary conditional vector operation, an input vector containing multiple operands to be used in conditional operations is divided into two or more output vectors based on a condition vector. Each output vector can then be processed at full processor efficiency without cycles wasted due to branch latency.

For example, in the chroma-keying example given above, conditional vector operations would be used as follows. First, a conditional vector operation is performed to divide the pixel indices i into two index vectors ib and if respectively containing indices of blue pixels from the foreground video stream and non-blue pixels from the foreground video stream as shown below:

```
For each pixel i,
    if (pf[i] is blue) append i to ib
    else append i to if
For each background pixel i in ib
    p[i] = pb[i];
    do background processing on p[i];
For each foreground pixel i in if
    p[i] = pf[i];
    do foreground processing on p[i];
```

Although the pseudocode example above is coded using a conventional conditional operation, it is in actuality implemented by steering pixel indices to the appropriate index vectors without any speculation or predication. Once the pixels have been segregated into the foreground or background in this way, subsequent chroma-key processing can be performed without conditional operations, processor cycles wasted due to branch latency, incorrect speculation or execution of unnecessary instructions due to predication.

Other examples of conditional operations include combining one or more input vectors into a single output vector based on a condition vector, conditional vector switching, conditional vector combining, and conditional vector load balancing.

BRIEF DESCRIPTION OF THE DRAWINGS

The above and other objects of the present invention will become readily apparent when reading the following detailed description taken in conjunction with the appended drawings in which:

FIG. 9A illustrates execution of an exemplary processing operation without conditional streams;

FIG. 9B illustrates conditional stream execution of an exemplary processing operation in conditional load-balancing mode according to an exemplary embodiment;

DETAILED DESCRIPTION OF THE PRESENTLY PREFERRED EMBODIMENTS

First, the overall architecture of an exemplary computer system employing an exemplary embodiment of the present invention will be described.

Central to the operation of this embodiment are the concepts of streams and kernels. A stream is a sequence of elements made up of a collection of related data words. A stream may be received by a computation kernel which executes the same operation on all of the elements in the stream to produce another stream that can be output or sent to other kernels for further processing.

Kernels are relatively small computational units that may only access local variables, read input streams and write to output streams. They cannot make arbitrary memory references. In one embodiment of the invention, the computation kernels are expressed in a C-like programming language and compiled into microcode programs that sequence the operation of arithmetic clusters to carry out compound stream operations on each element in a stream. The operations implemented by the kernels are called compound operations because in contrast to conventional vector or stream operations which perform only one operation on each vector element, each kernel performs multiple arithmetic operations on each stream element. A compound stream operation is a small program that has access to the record at the head of each of its input streams and to its local variables. The kernel reads the input streams and writes to the output streams using explicit instructions. The length and record size of each stream can be different and the number of input and output streams need not be the same.

Figure 1:
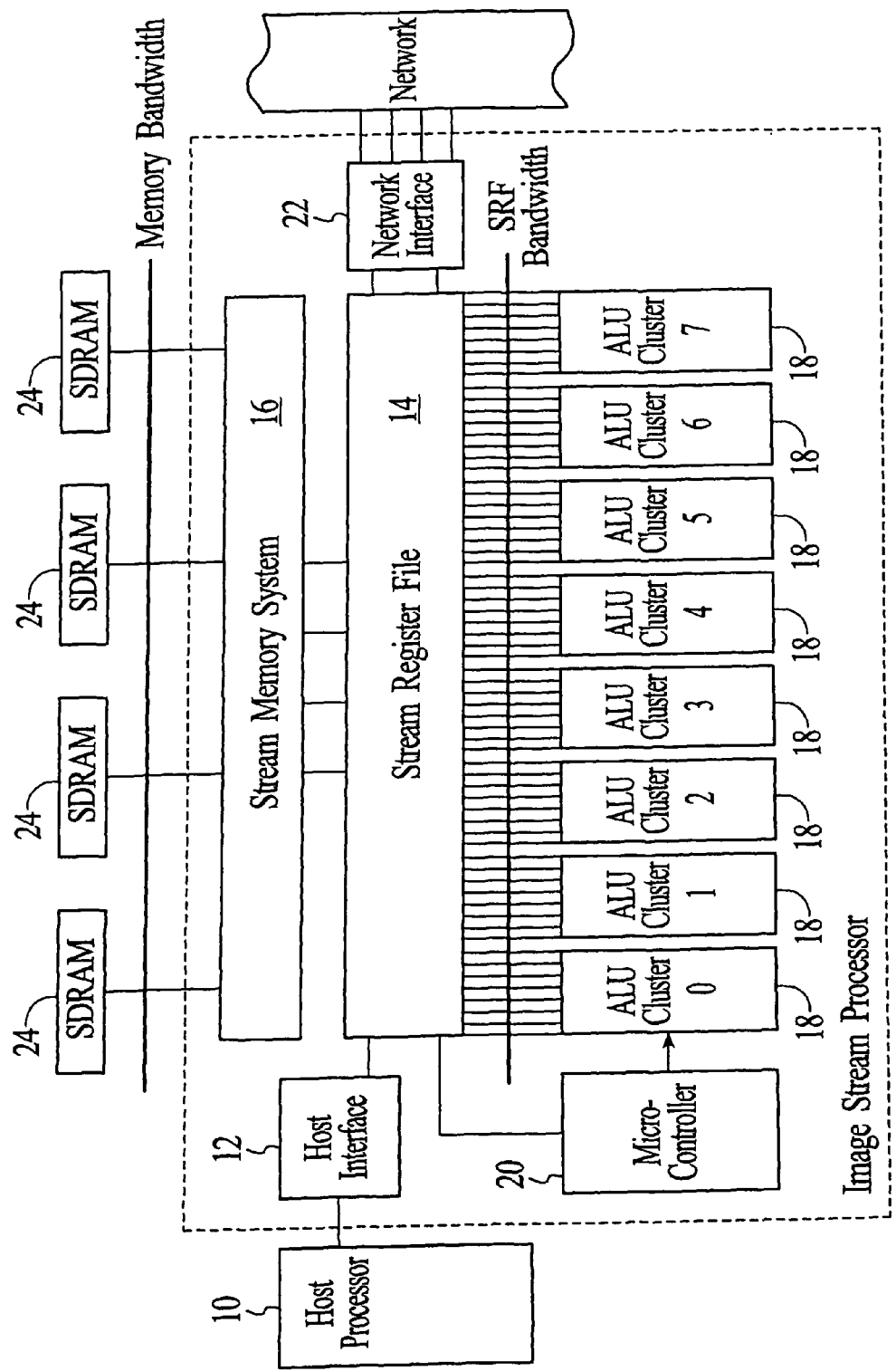
FIG. 1 is a block diagram of a graphics processor according to an exemplary embodiment of the invention.

With this foundation in mind, FIG. 1 shows a preferred embodiment of the present invention used in a high speed graphics coprocessor which is described in greater detail in U.S. patent application Ser. No. 09/152,763, now U.S. Pat. No. 6,192,384 incorporated herein by reference. Here, a host processor 10 provides data to an image stream processor via a host interface 12. The data from the host processor 10 are stored in a stream register file 14 which is the center of activity in the image stream processor. The host interface 12, a stream memory 16, arithmetic clusters 18, a microcontroller 20 and a network interface 22 all interact by transferring streams of data and instructions to and from the stream register file 14.

Figure 2:
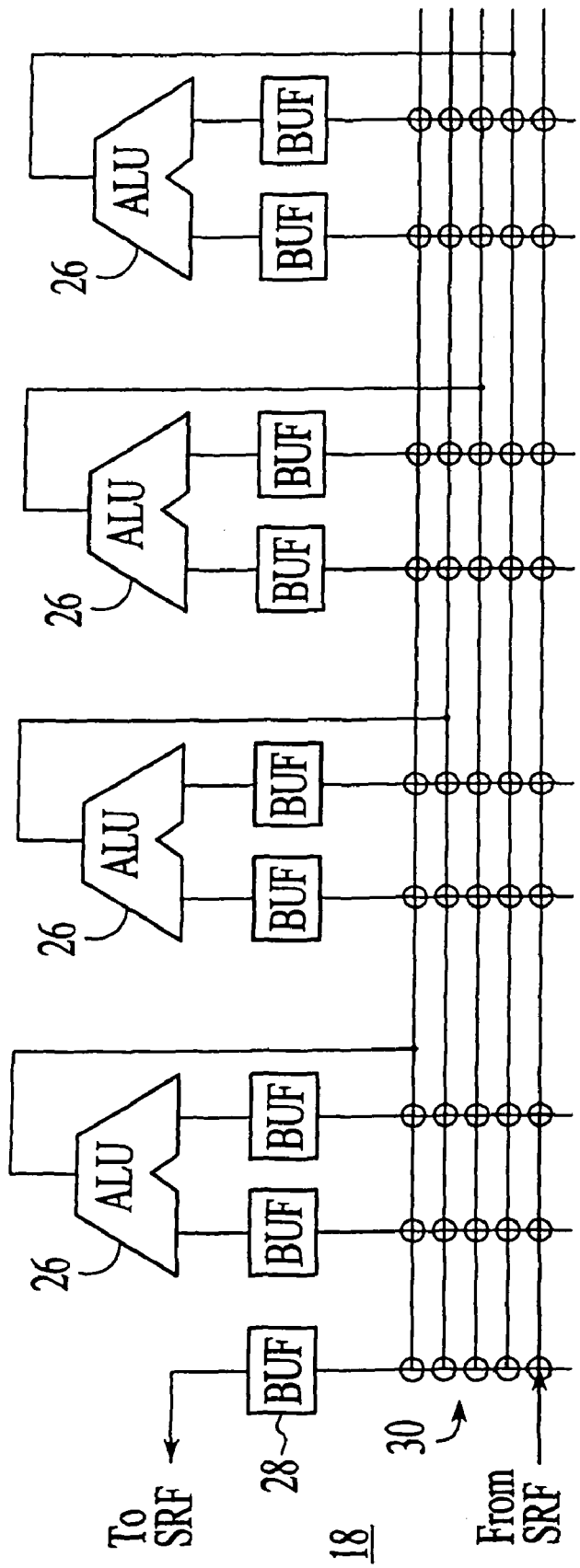
FIG. 2 is a diagram of an arithmetic cluster used in the graphics processor.

The system has a three-level storage hierarchy consisting of the stream memory 16 as a global storage unit, the stream register file 14 as an intermediate storage unit, and local register files or buffers 28 (see FIG. 2) in the arithmetic clusters 18 as local storage units. The stream memory 16 holds persistent data; the stream register file 14 stores streams as they are passed to, from and between computation kernels, and the arithmetic clusters 18 use the local register files 28 to store intermediate results produced during computations within the cluster 18 so they do not need to recirculate through the stream register file 14.

The stream register file 14 is preferably a 64 kB memory organized to handle streams of data and instructions (of course, the size of the stream register file may be varied according to the application). An array of eighteen 64-word stream buffers are used to allow read/write access to eighteen streams simultaneously. The internal memory array is thirty-two 32-bit words (i.e., 1024 bits) wide so that it can fill or empty half a stream buffer each cycle. Each stream client may access its dedicated stream buffer every cycle if there are data available to be read or space available to be written. The clients of eight of the stream buffers are the eight clusters 18, and these stream buffers are accessed eight words at a time. The remaining ten stream buffers are accessed a single word at a time.

The stream memory system 16 can perform two simultaneous memory transfers between four thirty-two bit wide synchronized dynamic random access memory (SDRAM) banks 24 and the stream register file 14 via four stream buffers (two for data and two for indices) in the stream register file 14.

The eight arithmetic clusters 18 connected to the stream register file 14 are controlled by the microcontroller 20. Each cluster 18 operates on one record of a stream so that eight records can be processed simultaneously. An exemplary internal structure of an arithmetic cluster 18, shown in FIG. 2, includes four functional elements 26 each buffered by two of the local register files 28 which store kernel constants, parameters and local variables, thereby reducing the bandwidth load on the stream register file 14.

The local register files 28 themselves are fed by a crosspoint switch 30 which distributes outputs of the functional elements 26 to inputs thereof as intermediate data for use in subsequent arithmetic operations. The output of each functional element 26 is connected to one of the input lines of the crosspoint switch 30, and the input of each local register file 28 is fed by a corresponding output line of the crosspoint switch 30. Additionally, four of the crosspoint input lines are fed by the stream register file 14 to provide the contents of the stream dedicated to that cluster, and four of the crosspoint output lines are returned to the stream register file 14 for writing into that stream.

Figure 3:
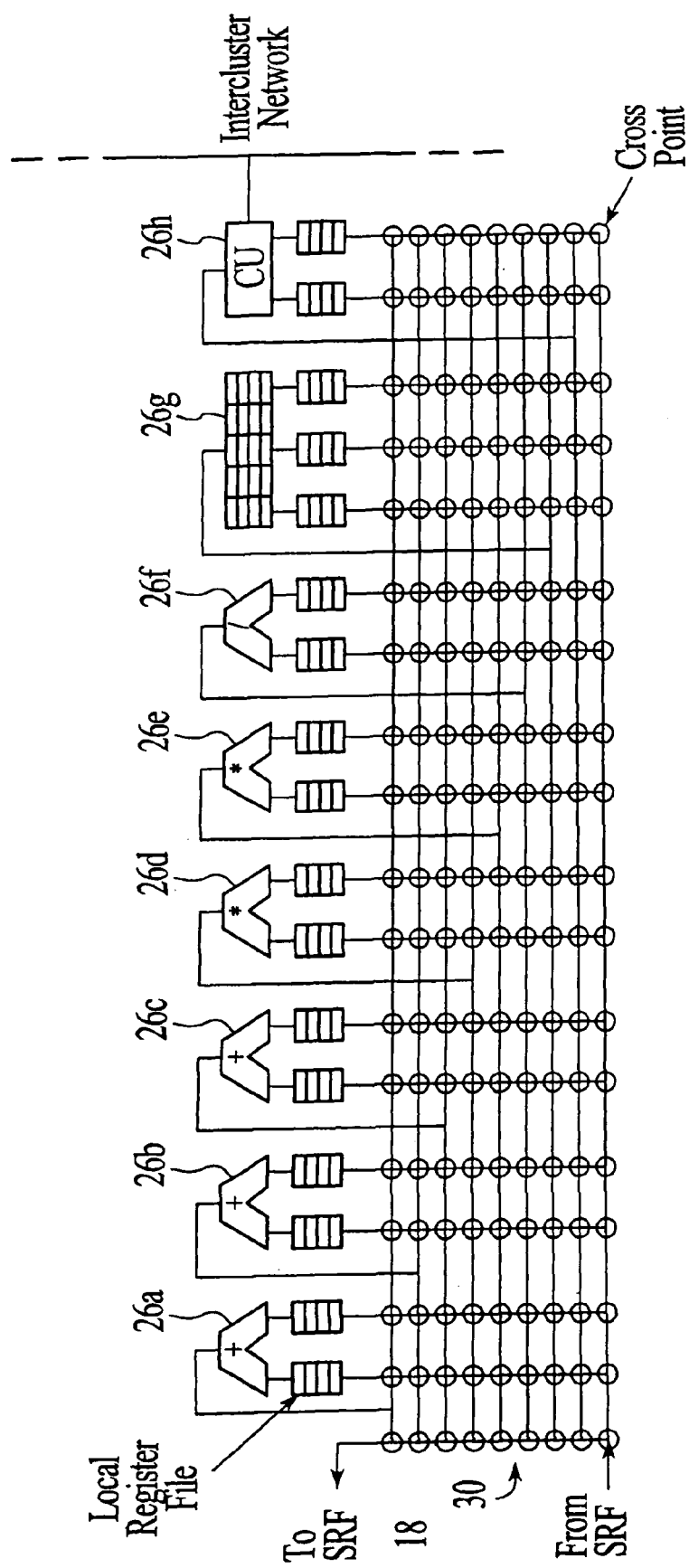
FIG. 3 is a diagram of an arithmetic cluster having variegated functional elements.

Another implementation of the arithmetic cluster 18 structure is shown in FIG. 3 in which three adders 26a-26c, two multipliers 26d and 26e, a divider/square root unit 26f, a 128 entry scratchpad register file 26g, and an inter-cluster communication unit 26h are collectively employed as functional elements 26.

The scratch pad register file 26g can be indexed with a base address specified in an instruction word and an offset specified in a local register and may be used for coefficient storage, short arrays, small lookup tables and some local register spilling. The adders 26a-26c and multipliers 26d and 26e have latencies of four and five cycles, respectively, are fully pipelined and perform single precision floating point arithmetic, 32-bit integer arithmetic, and 8-bit or 16-bit parallel subword integer operations. The adders 26a-26c also are able to perform 32-bit integer and parallel subword integer shift operations. The divider/square root unit 26f is not pipelined and operates only on single precision floating point and 32-bit integers.

Finally, the intercluster communication unit 26h performs data transfer among clusters using arbitrary communication patterns. This is particularly useful in applications such as Fast Fourier Transforms where interaction is required between adjacent stream elements.

The microcontroller 20 receives kernels as compiled VLIW microcode programs from the host processor 10. The microcontroller 20 executes each of the kernels as an independent process using the arithmetic clusters 18 for performing computational operations.

The network interface 22 connects the stream register file 14 to four bidirectional links that can be used to connect the graphics processor to other like processors.

Preferably, a substantial portion of the graphics coprocessor, particularly including the stream register file 14, arithmetic clusters 18 and microcontroller 20, are implemented on a single chip using VLSI techniques. This is particularly advantageous because it allows accesses within the arithmetic clusters 18 and accesses to the stream register file 14 to be internalized, thus freeing up more of the pin bandwidth to be used for communication with the stream memories 24. In fact, it appears that a coprocessor as disclosed herein can be implemented on a 1 cm$^2$ 0.25 μm CMOS chip operating at 400 MHz and perform up to 16 billion operations per second.

Figure 4A:
FIGS. 4A-4E show the structure of the instruction set of the graphics processor.
Figure 4B:

The application-level instruction set used by the host processor 10 to program the graphics coprocessor is shown in FIGS. 4A-4E. The set includes two complementary Load and Store instructions which are used to move streams between the stream register file 14 and the stream memory 16. As shown in FIGS. 4A and 4B, each instruction includes a stream descriptor which identifies a starting location of the stream to be loaded into the stream register file 14 or stored in the stream memory 16, and an address descriptor which specifies the record size, base address in memory and addressing mode, e.g., constant stride, indexed or bit-reversed. Optionally, the length of a stream in the stream register file 14 may be included.

Figure 4C:
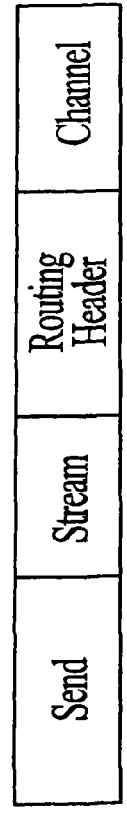
Figure 4D:
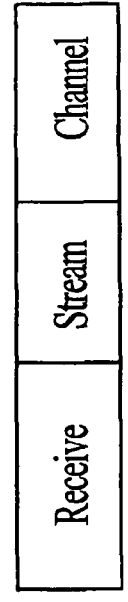

FIGS. 4C and 4D show Send and Receive instructions which allow streams to be passed from the stream register file 14 of one graphics coprocessor to that of another. These instructions are particularly advantageous because they allow multiple processors to operate in cooperation and provide extensibility and scalability. The Send instruction shown in FIG. 4C includes the stream to be sent, a routing header identifying the external coprocessor to which the stream is sent, and a channel indicator designating the communications channel used so that a single node can discriminate between arriving messages. Similarly, the Receive instruction of FIG. 4D includes the stream to be received and a channel indicator designating the communications channel for node discrimination of multiple messages.

Figure 4E:
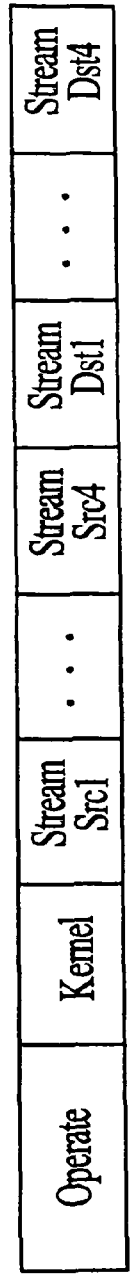

Finally, the Operate instruction of FIG. 4E invokes a kernel to perform its compound stream operation on one or more input streams to generate one or more output streams. The instruction includes a kernel field designating the kernel to be activated, up to four input stream designators which identify streams to be used to provide input data to the kernel's compound stream operation, and up to four output stream designators which identify streams to which results of the compound stream operations are provided.

The host processor 10 issues these application-level instructions to the coprocessor with encoded dependency information which specifies the system resources and data needed to execute the instructions. The host interface 12 buffers these instructions and, when their requirements are satisfied, issues them to the coprocessor. The host interface 12 also maps the coprocessor to the host's address space so that the host can read and write to the stream memory 16 and execute programs that issue the appropriate application-level instructions to the coprocessor.

Figure 5:
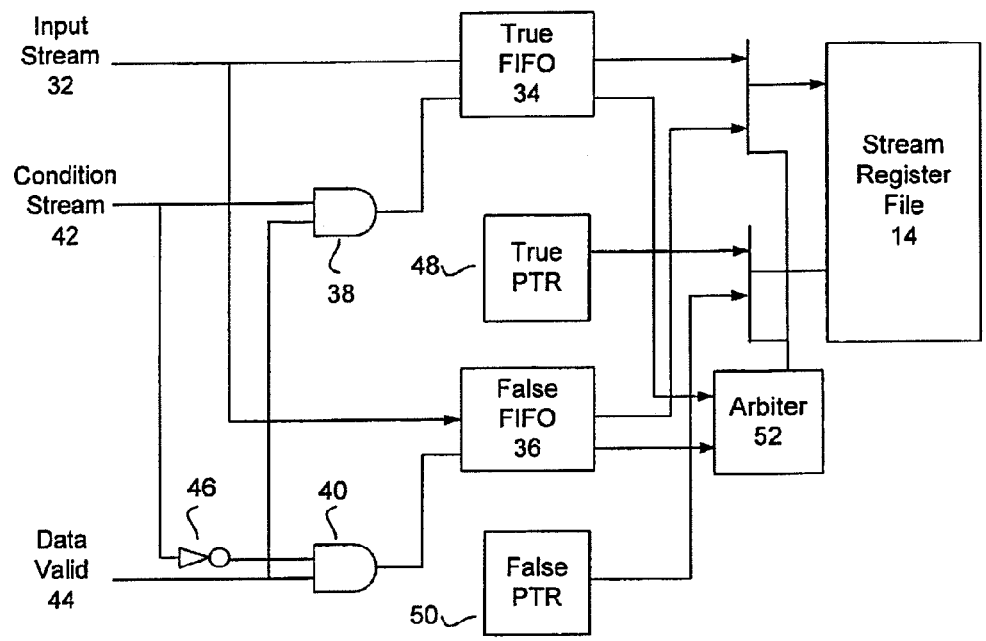
FIG. 5 is a diagram showing how elements are steered into output vectors in a conditional vector operation.

As noted above, another form of latency which occurs in processors is branch latency resulting from the dependency of processing on the evaluation of a conditional operation. Using conditional vector operations, branch latency can be reduced. FIG. 5 is a block diagram conceptually showing how a conditional vector output operation is implemented in the present invention. This Figure is a simplified depiction of how a single vector operation would be performed in the preferred embodiment. In actual practice, this operation is complicated by the fact that eight elements are handled at a time. Also, although the conceptual diagram of FIG. 5 shows the generation of both true and false vectors, the preferred embodiment generates only one vector at a time, and two passes are necessary to produce both true and false vectors.

Referring to FIG. 5, an input stream 32 of input data values to be operated upon is simultaneously fed to a True FIFO 34 and a False FIFO 36. The True and False FIFOs 34 and 36 are respectively enabled by AND gates 38 and 40 which are driven by data on a condition stream 42 and a data valid signal 44, and the values in the condition stream 42 are in one-to-one correspondence with the input data values.

The data valid signal 44 indicates when a new valid data item is on the input data line. This line may be asserted in response to, e.g., a conditional output instruction from the microcontroller 20. When the data valid signal 44 is asserted, the True FIFO 34 is enabled to store the data value present on the input stream 32 when the condition stream 42 indicates that the data value satisfies a given condition, and the False FIFO 36 is enabled when the condition stream 42 indicates that the data value does not satisfy the condition (note the inverter 46 in the enable logic for the False FIFO 36). A True PTR register 48 and a False PTR register 50 maintain pointers to the ends of a True vector and a False vector, respectively, in stream register file 14, and these pointers are used to index the True FIFO 34 and False FIFO 36 outputs into the stream register file 14. Presentation of the FIFO outputs and pointers to the stream register file 14 is controlled by an arbiter 52 so that when an eight word-wide section of data values is ready to be appended to the True vector or the False vector within the stream register file 14, the arbiter 52 allows one of the FIFOs to present the data section for storage in the stream register file 14.

This concept may be implemented in the above-described architecture as follows. First, the microcontroller 20 controls the arithmetic clusters 18 to generate or receive a number of input data values, each having a condition value associated therewith (the condition values are typically computed as the result of comparison operations). Then, a dedicated hardwired circuit performs a parallel prefix scan-+ operation as disclosed in, e.g., Cormen et al., *Introduction to Algorithms (MIT Electrical Engineering and Computer Science Series)*, MIT Press, ISBN 0262031418 (incorporated herein by reference) on the condition bits to generate a partial scratchpad index for all data values so that elements having the same condition value, e.g., true or false, are indexed into the same scratchpad area. The preferred embodiment uses a hardwired circuit to perform the scan-+ operation because the indices are preferably calculated and the values preferably written into the scratchpad in one cycle, in order to avoid a bottleneck. Thus, a hardware implementation is used. Each partial index is added to the current running index for the vector corresponding to that condition value and the input data value is stored in the scratchpad register file location pointed to by the absolute index thus obtained via the clusters' inter-cluster communication units 26h. This is done by generating the absolute index so that its least significant three bits denote the destination arithmetic cluster 18 and the remaining bits index into that cluster's scratchpad register file 26g.

Each time a new value is written into a scratchpad register file 26g, the running index is incremented so that subsequently-generated values will be appended to the end of the vector. The incrementing is done modulo-16 using only the least-significant four bits of the running index so that when indexing passes the end of the buffer, it continues at the beginning to effectively implement a 16-word ring buffer. In this way, while one set of eight words is being transferred to the stream register file 14 (as noted above, information exchange between the arithmetic clusters 18 and the stream register file 14 is performed in groups of eight words), another eight word set is being assembled. Once eight words have been written in one of the scratchpad register files 26g, they can be output to the stream register file 14 for further processing.

In a preferred embodiment of the present invention, only one condition, true or false, is processed in one pass, as mentioned above and as will be described below. Taking the "true" valued processing as an example, FIFO 34 is implemented as two storage locations in each of the scratch pad register files 26g of an arithmetic cluster 18, thereby totaling sixteen locations. These storage locations are indexed by a four-bit running index or counter in the microcontroller 20. In a conditional vector output operation, the parallel prefix scan-+ operation is performed on the condition bits to calculate a relative index for each value corresponding to a "true" condition. These relative indices are added to the four-bit counter in the microcontroller 20 to compute a location for each "true" value. The location for each value consists of three bits denoting which of the eight arithmetic clusters 18 will store the value, and one bit indicating which of the scratch pad locations within that particular cluster 18 will be used.

These values are then used to configure the communication unit 26h of each cluster 18 to index its scratchpad register 26g (along with a base pointer stored in the microcontroller 20) so that each "true" value is written to the appropriate location in the scratchpad register 26g of the appropriate arithmetic cluster 18. The counter in the microcontroller 20 is then incremented by the number of true values thus stored. Each time the counter is incremented by eight, the contents of the corresponding scratchpad locations are written to the stream register file 14.

As an example, suppose the condition bits are 00101100 and the running index is 6. The result of the parallel prefix scan-+ operation is 00011233. Since only the "true" values are used, the result of the scan-+operation can be regarded as xx0x12xx, where "x" signifies a "don't care" condition. Adding the running index to each of these partial indices yields xx6x78xx. This means that the first "true" value is stored in the first slot in arithmetic cluster number 6, the second "true" value is stored in the first slot of arithmetic cluster number 7 and the third "true" value is stored in the second slot of arithmetic cluster number 8 (the second slot is used because the index 8 is greater than the highest numbered arithmetic cluster (7)).

The values are routed to the appropriate arithmetic clusters 18 by using the condition bits and the running index to calculate a command vector of 5xxxxx24. This command vector is used to configure the intercluster communication units 26h of each arithmetic cluster 18. The command vector 5xxxxx24 denotes that arithmetic cluster number 0 receives a value from cluster number 5; arithmetic cluster 6 receives a value from cluster number 2; and arithmetic cluster number 7 receives a value from cluster number 4, with the remaining clusters being in a "don't care" state. The scratchpad registers 26g of each of the three thus-selected clusters (0, 6 and 7) are then indexed by a base pointer plus the slot value. For example, if the base pointer is 32, the scratchpad indices for the eight clusters would be 33xxxxx3232 (note that the second slot in cluster number 0 is being used). Then, since three "true" values have been written, the number of written values totals nine and the first eight are written to the stream register file 14.

Figure 6A:
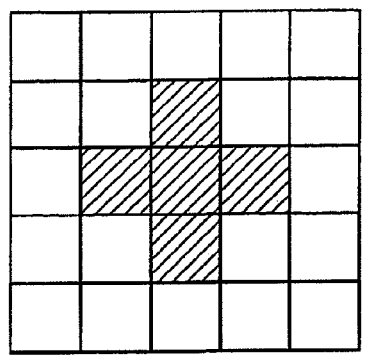
FIGS. 6A and 6B are foreground and background images, respectively, used in an example of conditional vector processing according to the above embodiment.
Figure 6B:
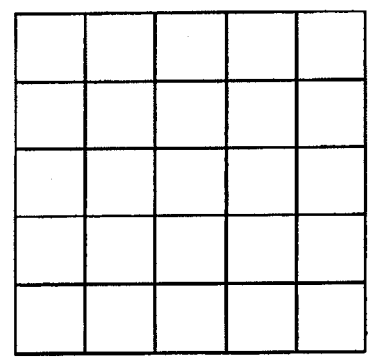

Consider as an example the 5×5 bit foreground and background images shown in FIGS. 6A and 6B, respectively. Assuming that the foreground image of FIG. 6A is to be superimposed on the background image of FIG. 6B using chroma-keying, the pixels are sequentially indexed right-to-left beginning with the upper left-hand corner and a blue foreground color (which is not to be included in the superimposed image) is represented by "7", the clusters would generate the following input data values and associated condition values for each pixel index:

| 0  | 1  | 2  | 3  | 4  |
|----|----|----|----|----|
| F  | F  | F  | F  | F  |
| 5  | 6  | 7  | 8  | 9  |
| F  | F  | T  | F  | F  |
| 10 | 11 | 12 | 13 | 14 |
| F  | T  | T  | T  | F  |
| 15 | 16 | 17 | 18 | 19 |
| F  | F  | T  | F  | F  |
| 20 | 21 | 22 | 23 | 24 |
| F  | F  | F  | F  | F  |

Processing the pixel data for the foreground and background images so that a pixel index is written to the true vector when the corresponding condition value is true and to the false vector when the corresponding condition value is false results in a true vector of

<7 11 12 13 17> and a false vector of

<0 1 2 3 4 5 6 8 9 10 14 15 16 18 19 20 21 22 23 24> which are stored in respective ones of the arithmetic cluster scratchpad registers 26g. Since the true vector has only five elements, it will not be output to the stream register file 14 until additional values are written into the scratchpad register 26g holding the true file to reach a total of eight words (assuming the scratchpad register 26g was previously empty). However, since the false vector is twenty elements long, eight elements will be written to the stream register file 14, followed by eight more elements to leave a final set of four elements in the false vector scratchpad register. Once the true and false vectors are written to the stream register file 14, foreground and background processing may be performed on the pixels referenced by the vector index elements as is known in the art. If the length of the final vector is not a multiple of eight, all eight words in the scratchpad buffer are written back to the stream register file 14 and the actual count is provided to update the output stream length. The length of the result stream is stored in a register file associated with the stream register file 14.

In the complementary conditional vector input operation, each arithmetic cluster 18 generates a conditional value indicative of whether data should be written to it (e.g., "1" for yes, "0" for no). Then, a conditional vector input instruction is executed by the microcontroller 20 to distribute a word from the input stream to each arithmetic cluster 18 which generated a "true" condition. This is done by keeping the next eight to sixteen elements of the input stream in the scratchpad registers 26g of the arithmetic clusters 18. As with the conditional vector output operation, the microcontroller 20 maintains a base pointer and a four-bit running index. A parallel prefix scan-+ operation is performed on the condition values to compute the communication command and scratchpad indices similar to the technique used above; however, in the conditional vector input operation, data are distributed rather than concentrated and the scratchpad registers 26g are read rather than written.

For example, suppose the base pointer is 16, the running index is 6, and the condition values generated by the arithmetic clusters 18 are 10100010. The parallel prefix operation yields 01122223, or representing "false"-valued conditions by a don't care state, 0x1xxx2x. Adding the running index to this yields 6x7xxxx8x, thereby providing a communication command vector 6x7xxx0x to be applied to the intercluster communication units 26*h* and a scratchpad index vector of 17 x x x x x 16 16. Thus, cluster number 0 reads the first slot of cluster number 6; cluster number 2 reads the first slot of cluster number 7; and cluster number 6 reads the second slot of cluster number 0 (note the index 17 for cluster number 0 in the scratchpad index vector). This causes the pointer to roll over, and eight more values are read from the stream register file 14 into location 16 in each scratchpad register file 26*g*.

Thus, a processor according to an exemplary embodiment of the present invention implements conditional vector operations in which an input vector containing multiple operands to be used in conditional operations is divided into two or more output vectors based on a condition vector. Each output vector can then be processed at full processor efficiency without cycles wasted due to branch latency. Data to be processed are divided into two groups based on whether or not the data satisfy a given condition by, e.g., steering each to one of two index vectors. Once the data have been segregated in this way, subsequent processing can be performed without conditional operations, processor cycles wasted due to branch latency, incorrect speculation or execution of unnecessary instructions due to predication. Other examples of conditional operations include combining one or more input vectors into a single output vector based on a condition vector, conditional vector switching, conditional vector combining, and conditional vector load balancing.

As noted above, a stream is a sequence of elements made up of a collection of related data words. A conditional stream is a data stream that is accessed conditionally, based on a condition value local to a processing element (PE) such as ALU cluster 18. Conditional streams include conditional input streams and conditional output streams. Conditional access allows arbitrary stream expansion and stream compression in space (across hardware partitions) and time (across loop iterations). As will be shown, this property allows efficient execution of applications with data-dependent control on a SIMD architecture.

Figure 7A:
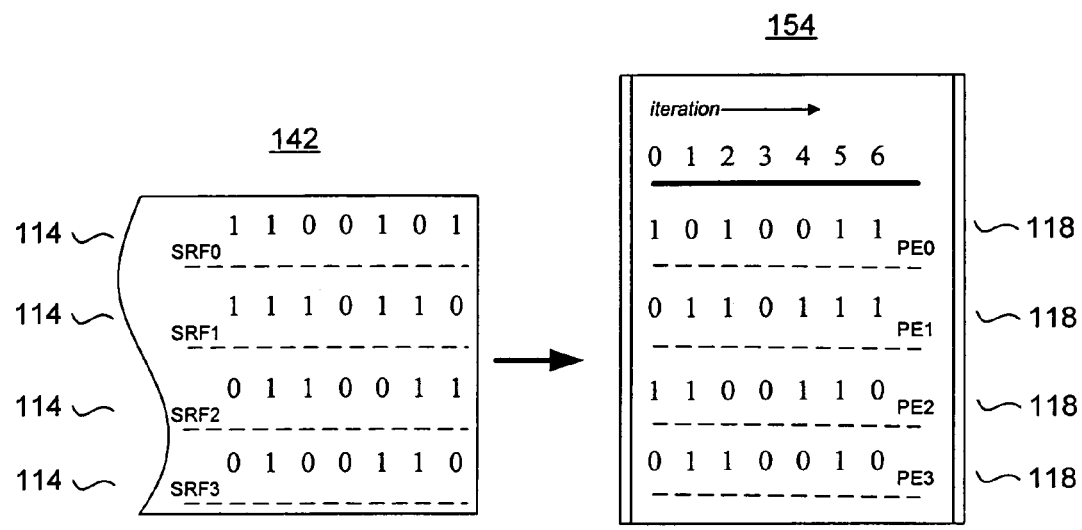
FIGS. 7A and 7B show conditional input stream execution with four processing elements according to an exemplary embodiment.
Figure 7B:
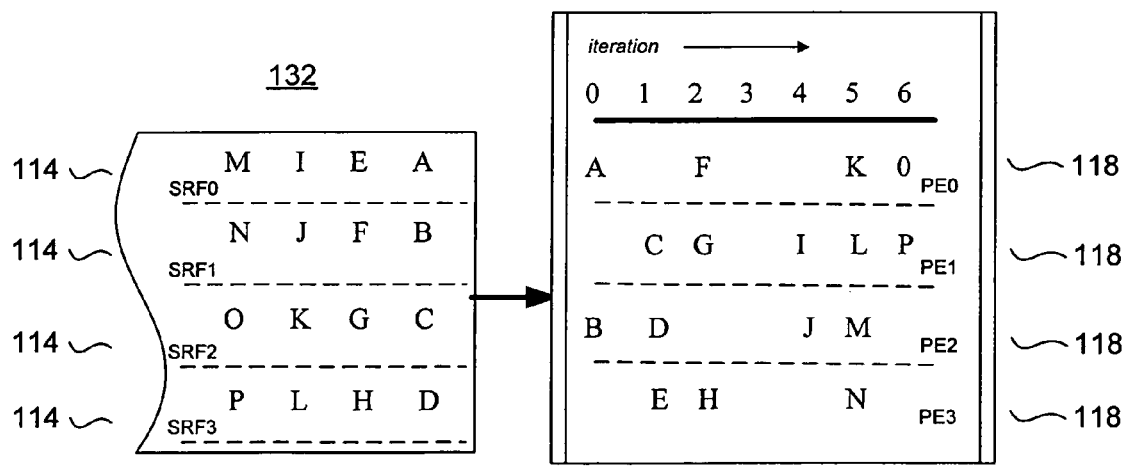

FIGS. 7A and 7B show the data movement performed by a conditional input stream 132 operating on a SIMD machine with four partitions and four PE's 118. Note that the convention adopted here is that the elements in a stream are ordered from top to bottom then right to left, and that time in a kernel, such as the kernel 154, goes from left to right. The dotted lines in FIGS. 7A and 7B separate data and hardware associated with each partition, including respectively the PEs PE0, PE1, PE2, and PE3 118 and the stream register file partitions SRF0, SRF1, SRF2, and SRF3 114. Each PE 118 independently decides whether to read a record from the input stream 132 each iteration based upon condition values from a condition stream 142. On cycle 0, only PE0 118 and PE2 118 have a TRUE condition value. Thus, the first two elements of the input stream 132, the values A and B, are transferred to these PEs 118, PE0 and PE2. The data value B is transferred from stream register file partition 114 SRF1 to PE2, requiring communication across the partitions as described in greater detail below. During the second iteration, the PEs 118 PE1, PE2 and PE3 read from the input stream 132, receiving data values C, D, and E from SRF2, SRF3 and SRF0, respectively. Each PE 118 that reads a value from the input stream 132 receives the next value in sequence regardless of the SRF partition 114 in which that value is located. In effect, the input stream 132 is expanded in space (across hardware partitions) and in time (across loop iterations) according to the condition values in the condition stream 142. In contrast, a conventional SIMD machine can only decide on each loop iteration whether or not all PEs should collectively read the next four values from the stream. On these conventional machines, cross-partition communication requires cycling data through the memory system or coordinating communication through the inter-processor switch with software.

FIG. 7A illustrates the execution of the simple primitive condition>>sel and FIG. 7B illustrates the execution of the simple primitive input_stream(sel)>>data in the following kernel 154 pseudocode:

```
kernel example (    // An input stream to this kernel
                    istream<bool> condition,
                    // A conditional input stream to this kernel
                    cistream<int> input_stream)
{
    loop_until (condition.empty( )) {
        // sel determines which PEs will
        // access the conditional input stream
        condition >> sel;
        // A PE receives a data value of the conditional
        // input stream only if sel is true in that PE
        input_stream(sel) >> data;
    }
}.
```

The programmer has access to conditional stream functionality via the simple primitive input_stream(sel)>>data. This primitive can be used in a variety of modes to enable SIMD processors to efficiently execute applications with data-dependent control. All of the following modes can be classified as space-time expansions or compressions of data streams.

The Conditional Switching Mode

First, the switch mode uses conditional output to compress. In this mode, data are routed into one or more output streams such that each output stream will consist of homogeneous data. This guarantees that even though different control flow and different computations may be required to process each of these resulting output streams, every data element within a particular output stream can be processed identically.

Figure 8A:
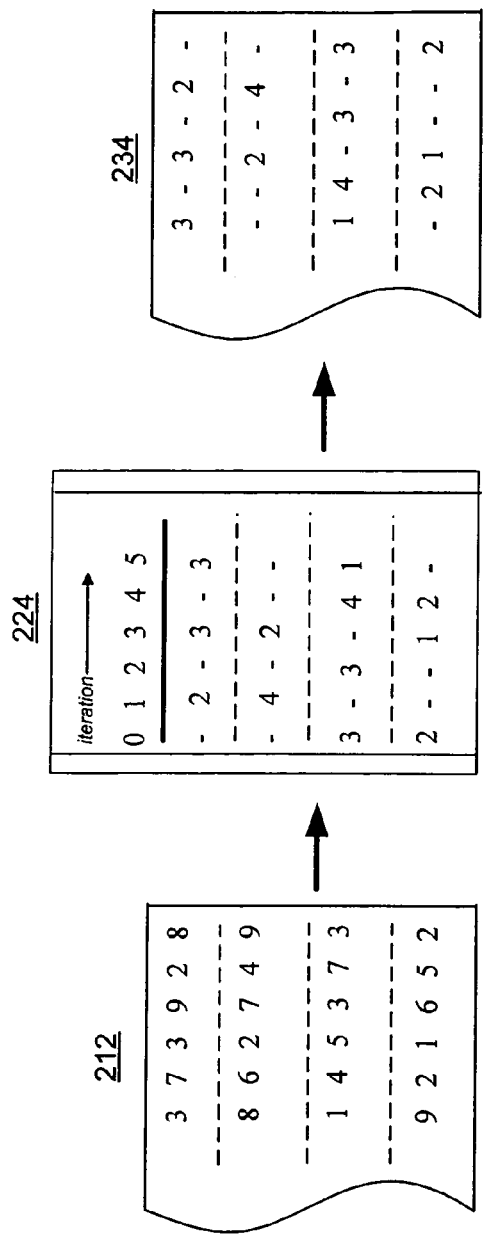
FIG. 8A illustrates execution of an exemplary filtering/processing operation without conditional streams.
Figure 8B:
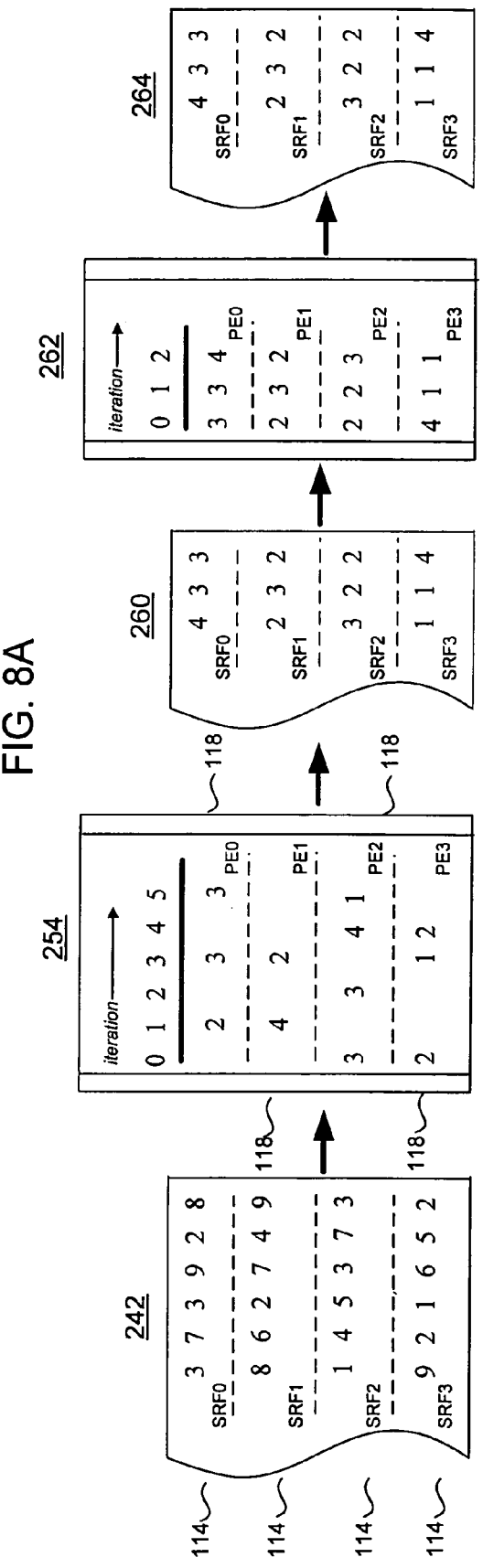
FIG. 8B illustrates conditional stream execution of an exemplary filtering and processing operation in conditional switching mode according to an exemplary embodiment.

FIG. 8A illustrates execution of an exemplary filtering/processing operation without conditional streams. FIG. 8B illustrates conditional stream execution of an exemplary filtering and processing operation in conditional switching mode according to an exemplary embodiment. Both operations read an input stream, filter out values that are greater than four, perform a non-trivial computation on the remaining values, and output the results. Note that FIGS. 8A and 8B illustrate the case where the computation is simply f(x)=x for illustrative purposes; in general the computation can be much more complex.

As shown in FIG. 8A, without conditional streams, the kernel 224 filter_process shown in the following pseudocode produces a mask output stream from an input stream unfiltered 212:

```
kernel filter_process (istream<int> unfiltered,
                       ostream<bool> mask,
                       ostream<int> processed)
{
    loop_until (unfiltered.empty( )) {
        unfiltered >> curr;
        valid = (curr <= 4);
```

```
            mask << valid;
            processed << compute (curr);
        }
    }
```

On a processor without conditional streams, each PE performs the computation and writes a result every loop iteration, even if a PE operates on a data element that is to be filtered out. A separate output stream, mask, indicates which elements of the output stream processed 234 are valid. When run on a SIMD machine, this code is inefficient in three ways. First, the function compute will be evaluated for all input elements, valid or invalid. Second, the invalid entries in the output stream 234 will decrease the duty factor of subsequent kernels. Further filtering may exponentially decrease that duty factor until the stream 234 is explicitly compressed through the main memory or inter-processor switch. Third, the final stream 234 will occupy more space than necessary in the register file since it contains many unnecessary invalid values.

By contrast, as shown in FIG. 8B, a SIMD processor according to an exemplary embodiment with conditional streams performs the same function as kernel 224 by executing two kernels 254, 262 shown in the following pseudocode:

```
        kernel filter (istream<int> unfiltered,
                       costream<int> filtered)
        {
            loop_until (unfiltered.empty ( )) {
                unfiltered >> curr;
                valid = (curr <= 4);
                filtered (valid) << curr;
            }
        }
        kernel process (istream<int> filtered,
                        ostream<int> processed)
        {
            loop_until (filtered.empty ( )) {
                filtered >> curr;
                processed << compute (curr);
            }
        }
```

When executing the first kernel, filter, 254 on an input stream unfiltered 242, each PE 118 performs the test on its input element and conditionally outputs the element to an intermediate stream, filtered, 260 which is now compressed, and contains only valid data. In the second kernel, process, 262 each PE 118 reads a datum from the filtered stream 260, performs the computation, and appends the result to the output stream processed 264. As the PEs 118 operate only on valid data, there is no unnecessary computation. There is also no reduction in duty factor downstream because the output stream 264 contains only valid data. In a preferred embodiment, the filtering operation is appended to the end of a previous computation kernel, eliminating the need for an additional kernel and its associated overhead.

Conditional switching is applicable to condition statement types of data-dependent control where the computation and output performed for a data element is dependent on the value of the data element. For example, different computation may be performed depending on the state of finite elements or the type of geometry primitives. This application of conditional streams is especially useful when a rare case, such as an exception, requires a lot of processing. Normally, most PEs would idle while the exception case is processed. Conditional switching, instead, extracts only these exception cases to be dealt with independently. This works well if ordering is not important; otherwise, a separate mask stream can be generated and used to restore order at a later stage.

The Conditional Combining Mode

Second among the modes which effectively implement space-time expansion or compression, the conditional combining mode uses conditional input to expand. Conditional input streams are used in this mode to combine two or more input streams into one output stream. The relative rates at which the input streams are processed will typically be data-dependent.

The following two pseudocodes show the implementation of an exemplary kernel, interleave, that produces an ordered stream (out) from two input streams and a third condition stream of condition values. Each condition value specifies from which input stream the next element of the output stream should originate: from inA if the condition value is true, from inB otherwise. The following first set of kernel pseudocode, which does not employ conditional streams, uses the values in the condition stream condition to generate an index stream (loadIdx) that will be used to gather the elements of inA and inB from main memory.

```
        kernel interleave (istream<bool> condition,
                           int addrA, int addrB,
                           ostream<unsigned int> loadIdx)
        {
            loop_until (condition.empty ( )) {
                condition >> sel;
                // Acnt = # of PEs below you in which sel==0
                // BCnt = # of PEs below you in which sel==1
                // Note: PEi is 'below' PEj if (i<j)
                Acnt = numBelow (sel); BCnt = MY_ID-Acnt;
                MyAddr = sel ? (Acnt + addrA) : (BCnt+addrB);
                // numA calculated by broadcasting highest PE's value
                numA=broadcast(NUM_PE-1, Acnt+ (sel ? 1:0));
                addrA+=numa; addrB+=NUM_PE-numA;
                loadIdx << myAddr;
            }
        }
```

The index stream loadIdx is generated by keeping explicit track of the running address of streams inA and inB in variables addrA and addrB respectively. After the index stream loadIdx is complete, the output stream is generated by storing the inA and inB streams to memory and then performing an indexed load using the addresses in the index stream (not shown). As in this example, the PEs in a traditional SIMD processor cannot arbitrarily control the consumption rate of an input stream without a memory operation. Since the consumption rates of the two input streams are not known a priori for the interleave operation, the PEs can only control the expansion of the inA and inB streams indirectly via the indices in loadIdx.

The following second set of kernel pseudocode, which employs conditional combining eliminates the extra memory operations and the explicit operations required for the address calculations.

```
        kernel interleave (istream<bool> condition,
                           cistream<int> inA,
                           cistream<int> inB
                           ostream<int> out)
```

```
{
    // assume condition.len == inA.len+inB.len
    loop_until (condition.empty ( )) {
        condition >> sel;
        inA (sel) >> a;
        inB (!sel) >> b;
        out << (sel ? 0 a : b);
    }
}
```

Based on the condition value sel, each PE 118 simply requests a value from the appropriate stream and appends the value to the output stream. Essentially, the conditional stream correctly expands the data to the PEs 118 so that the actual data can be interleaved while executing the kernel, obviating the need for extra memory transfers.

The Load-Balancing Mode

The third operational mode effectuating space-time expansion or compression, the conditional load-balancing mode uses conditional input to expand and conditional output to compress. When the results of a computation require a variable, data-dependent, amount of time to generate, conditional streams can be used in this mode. A PE 118 reads data from an input stream only when the PE 118 is ready to start processing new data and writes to an output stream only when a valid result has been generated.

Load-imbalance often occurs on SIMD processors when PEs with short computations idle while one or more PEs with long computations perform additional iterations. Furthermore, the idle PEs may also generate NULL outputs during these idle cycles. FIG. 9B, by comparison with FIG. 9A, shows how conditional streams can eliminate both the idle cycles and NULL outputs due to load-imbalance. For each input curr from the respective input streams, the kernels 324, 354 in the FIGS. 9A and 9B output the sequence of numbers {curr, curr–1, . . . , 1}. FIGS. 9A and 9B also illustrate the sequencing of the input and output streams during kernel 324, 354 execution.

In particular, FIG. 9A illustrates execution of an exemplary processing operation, shown as the following kernel 324 pseudocode, without conditional streams.

```
kernel process (istream<int> in,
                ostream<bool> mask,
                ostream<int> processed)
{
    loop_until (in.empty ( )) {
        in >> curr;
        // loop ends when (curr<=0) in all PEs
        loop_until (curr<=0) {
            mask << (curr>0);
            processed << curr--;
        }
    }
}
```

Two nested loops are used in the kernel 324; data are read from the input stream by the outer loop, while the inner loop iterates until every PE completes processing its element. PEs with smaller values of curr finish earlier but are forced by the SIMD control to continue executing loop iterations and generating NULL outputs in the output stream 334.

In contrast to FIG. 9A, FIG. 9B illustrates conditional stream execution of an exemplary processing operation, shown as the following kernel 354 pseudocode in conditional load-balancing mode according to an exemplary embodiment.

```
// uses conditional input stream to load balance
kernel process (cistream<int> in,
                ostream<int> processed)
{
    in (TRUE) >> curr;
    loop_until (in.empty ( )) {
        processed << curr--;
        // curr only updated if (curr==0)
        in (curr==0) >> curr;
    }
    // process final elements, if necessary
    cleanup ( );
}
```

In contrast to the code for the kernel 324, the code for this kernel 354 only uses a single loop. On each iteration of the loop, each PE 118 generates an output value for the output stream 364 and reads a new element from the conditional input stream only if the PE 118 has completed processing the previous element, (i.e., if curr==0). Thus, as soon as a PE 118 finishes processing a data element, the PE 118 requests and receives another one. A PE 118 neither idles while waiting for other PEs 118 to finish their computation, nor generates unnecessary NULL outputs. PEs 118 only remain idle when the input stream has been exhausted and while other PEs 118 finish processing their final elements.

In FIGS. 9A and 9B, a circle around a datum indicates the cycle the datum was received by the PE. The fourth PE in FIG. 9A and the PE3 118 in FIG. 9B only require one iteration to process the data element that they initially receive. Since conditional stream access is not used in the kernel 324 code executed in FIG. 9A, the fourth PE continues executing, outputting NULLs until the PE with the largest value of curr is finished three loop iterations later. The result is an output stream 334 containing several NULLs. In contrast to FIG. 9A, FIG. 9B shows PE3 118 processing a new data element in the second iteration using a conditional input operation. As the variance of the processing times for the data elements increases, the percent savings provided by conditional load-balancing also increases. However, the order of the outputs produced with conditional load-balancing differs from that produced with a traditional implementation, neither of which are the same order as would result from a strictly serial implementation. In this example, if the order of the outputs was a concern, a sort would preferably be performed on the output data, assuming additional ordering information was carried through the kernel 354.

Figure 10A:
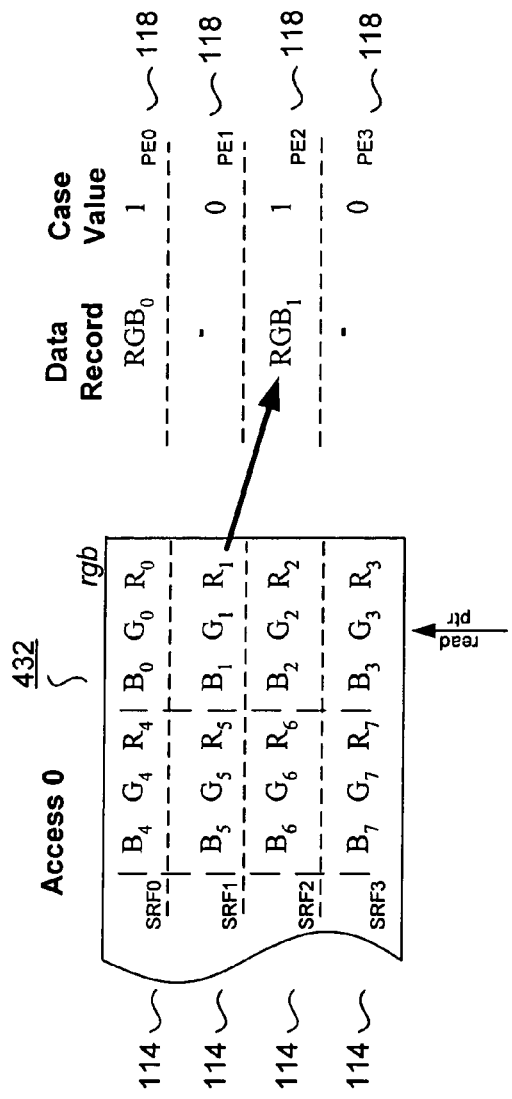
FIGS. 10A and 10B show sample conditional input access sequences according to an exemplary embodiment.
Figure 10B:
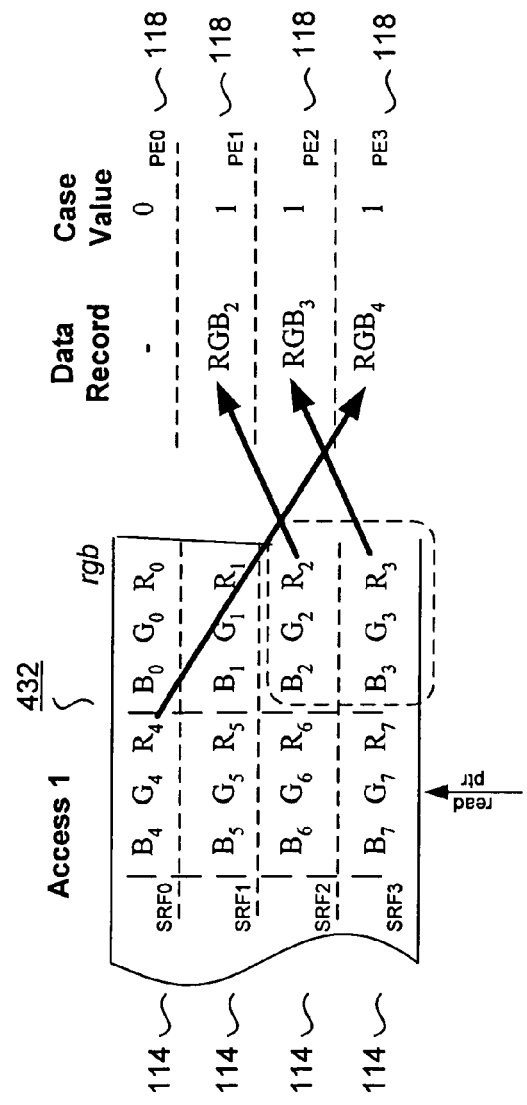

FIGS. 10A and 10B show sample conditional input access sequences, Access 0 and Access 1, respectively, according to an exemplary embodiment. Implementing conditional streams preferably requires both buffering and inter-partition communication of stream elements. The stream register file in the stream architecture described above operates under SIMD control; that is, each PE 118 accesses the same location within its own register file partition 114. Also, every PE 118 can only read from its associated register file partition 114. Conditional streams require additional functionality, as shown in FIGS. 10A and 10B. FIGS. 10A and 10B show two conditional stream accesses to an input stream 432 of RGB data records and indicates the communication and buffering needed.

FIG. 10A shows that the data record RGB 1 is needed by PE2 118 but is located in the register file partition 114 associated with PE1. Therefore, in Access 0, the data record RGB 1 is preferably communicated over an inter-processor switch. Access 1, in FIG. 10B requires reading the first records (RGB 2 and RGB 3) of certain register file partitions 114 and the second record (RGB 4) in another partition 114. The records RGB 2 and RGB 3 are preferably stored in a buffer in order to provide all needed data within the same iteration.

Figures 11A, 11B, 11C:
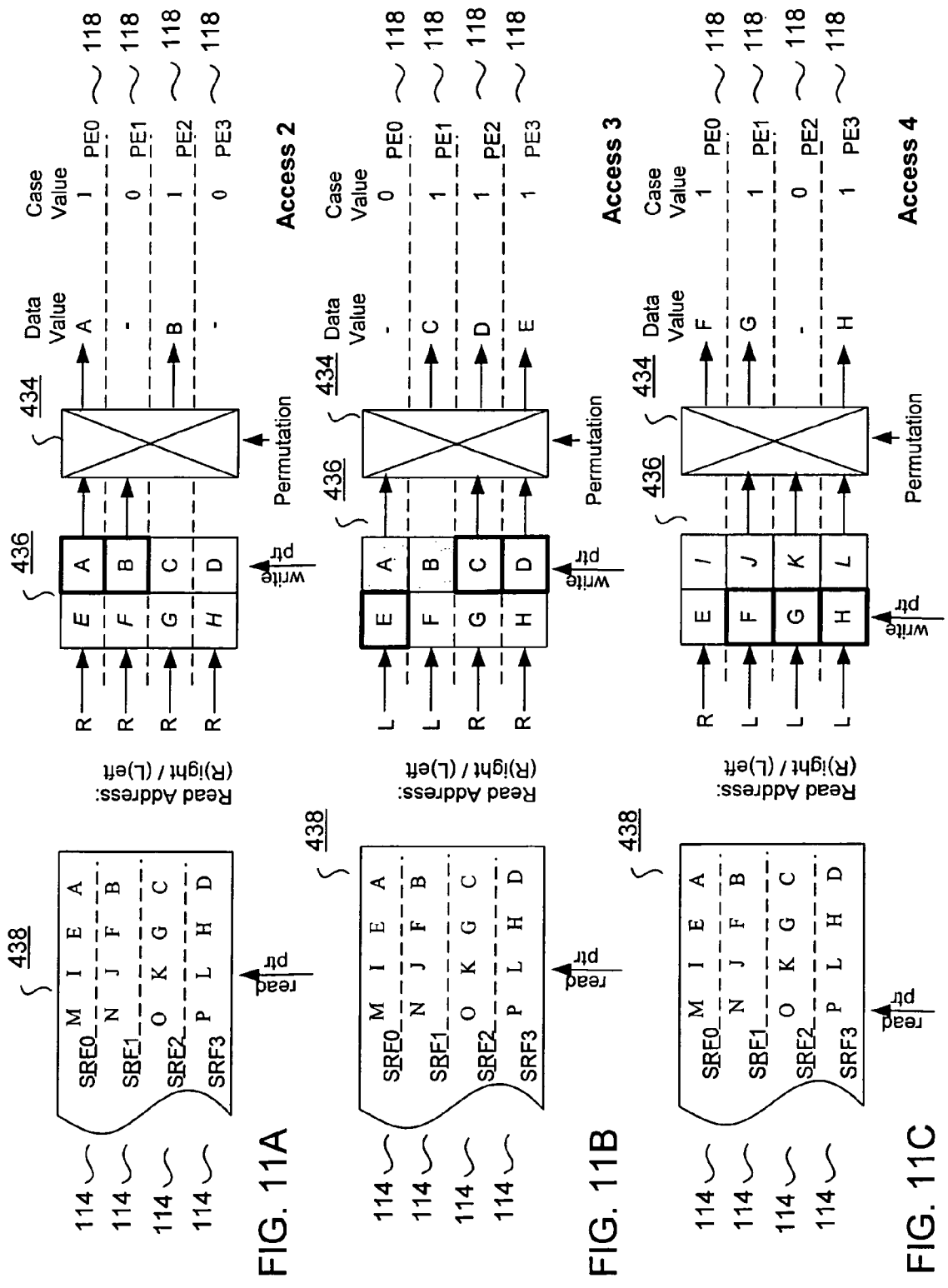
FIGS. 11A-11C and 12 show buffer and switch usage and control for a conditional input stream in an exemplary embodiment.

FIGS. 11A-11C and 12 illustrate how a buffer 436 that is indexed using a local pointer in each PE 118 in concert with an inter-processor switch 434 can be used to implement conditional stream operations. FIGS. 11A-11C illustrate the usage of the register file partitions 114, the buffer 436, and switch 434 for a sequence of three conditional input operations, Access 2, Access 3, and Access 4. In FIGS. 11A-11C and 12 the locations in the buffer 436 that are being read during the particular access are in-bold outlined boxes. In FIGS. 11A-11C the values which have already been read from the buffer 436 are in gray shaded boxes. In FIGS. 11A-11C and 12 the italicized entries in the buffer 436 indicates values from the input stream 438 that were written into the buffer by the previous access, or that where just initialized.

Figure 12:
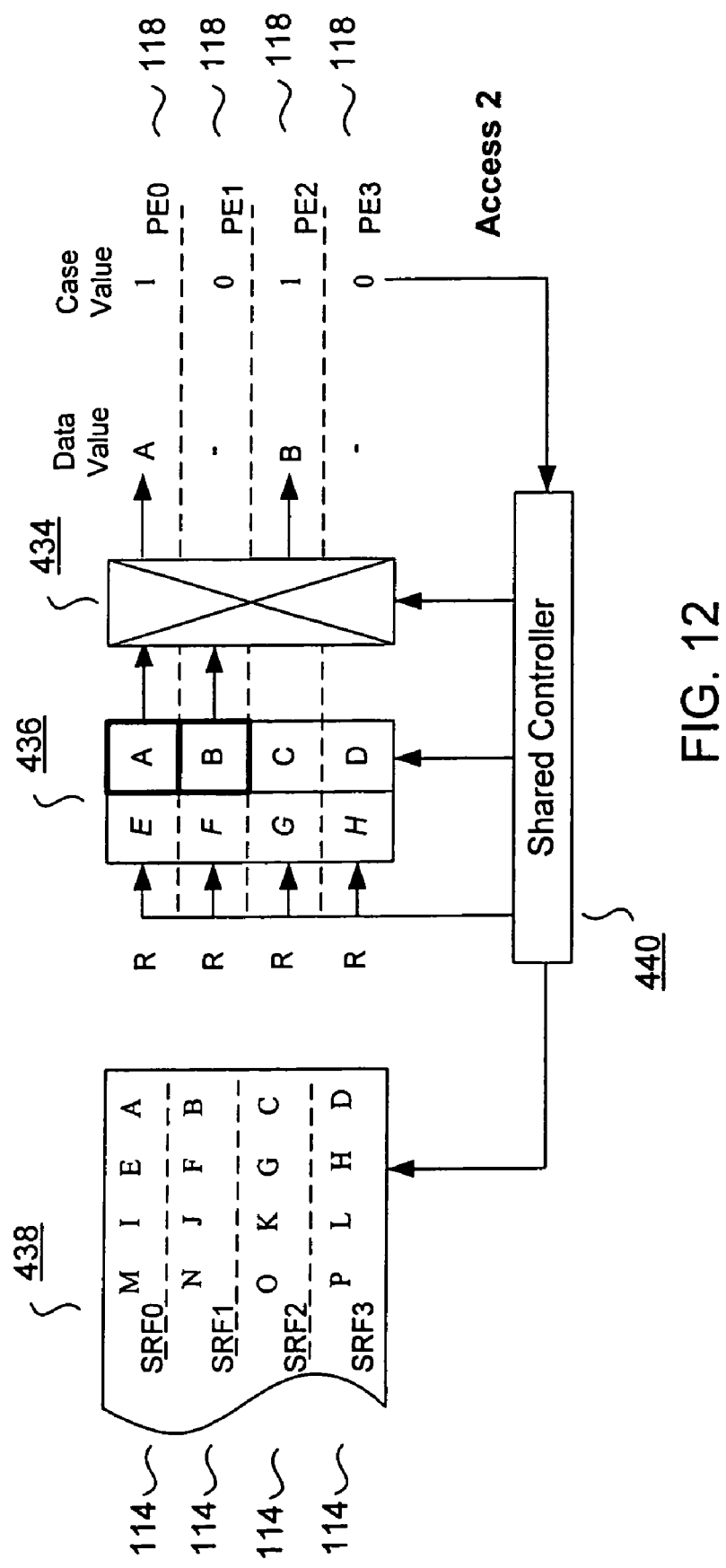

FIG. 12 can be described with reference to the first access, Access 2, of FIGS. 11A-11C. First, the condition values are examined to determine which PEs 118 require input data. The condition values 1 0 1 0 indicate that PE0 and PE2 are requesting input data from the input stream 438. Second, control signals are generated for the switch, buffer, and register file by a shared controller 440, shown in FIG. 12, using the condition values. The control signals from the shared controller 440 are used throughout the rest of the Access 2. Third, the appropriate buffer entry in each PE 118 is accessed. For this first access, both values come from the right-hand side of the buffer. Fourth, the data read from the buffer are communicated through the switch to the requesting PEs 118, in this case PE0 and PE2. Fifth and finally, if one side of the buffer 436 has been completely emptied by the operation, as occurs after the second access, the empty side of the buffer 436 is refilled by reading the next input stream 438 elements from the register file 114.

The shared controller 440 determines whether or not to read new data values from, for example, the input stream 438, into the buffer 436. The shared controller 440 also determines from which side of the buffer 436 each PE 118 should read, and determines the switch 434 configuration. For example, the first access in FIGS. 11A-11C, Access 2, only reads two values A and B from the right-hand side buffer 436 entries; hence, new values are not needed to replace A and B. Then, when the second access Access 3 reads three values C, D, and E and empties the right-hand side entries in the buffer 436, the controller 440 causes four new values I, J, K, and L to be read from the input stream 438 and written into these empty entries in the buffer 436. Since both data values A and B for the first access Access 2 are in right-hand side entries in the buffer 436, all read addresses are identical. However, the second access Access 3 requires data values that reside in different sides of the buffer 434 in the PEs 118, that is, values C and D are on the right (R) side and value E is on the left (L) side of the buffer 436. To account for this, the controller 440 sets the read addresses of the buffer differently in each PE 118.

Dealing with output conditional streams, with the final values of input and output conditional streams, and with record lengths greater than one are all relatively straightforward. Output conditional streams are supported by sending data in the opposite direction that that shown in FIGS. 11A-11C and 12. Data flow from the PEs 118 through the switch 434 into the buffer 436 and eventually into the register files partitions 114. At the end of an input stream such as input stream 438, there may not be enough data in the buffer 436 to satisfy all requests. Preferably, an extra value is generated by the controller 440 indicating to each PE 118 whether or not valid data were received. An output conditional stream may not have received enough data to fill the final buffer 436 entries. Preferably, a user-supplied NULL is used to fill those empty entries if necessary.

Finally, note that the accesses depicted in FIGS. 11A-11C and 12 are for non-record data types. In order to keep transfers of records atomic, preferably two entries in the buffer in each PE 118 are allocated for each record component, and the third through the fifth acts recounted above with regard with the first Access 2 shown in FIGS. 11A and 12 are preferably iterated for each record component.

Although the above exemplary embodiment uses a controller 440, it will be understood by those skilled in the art that conditional streams can also be implemented without any dedicated control, assuming that a suitable switch and a suitable method for executing a hardware select (to perform the buffering) are available in each PE 118. In this case, for example, the controller's functionality can be completely duplicated in software by storing the necessary input stream state, albeit redundantly in some cases, in every PE 118. The condition values are broadcast over the switch 434, and each PE 118 uses this information in conjunction with the stream state each PE 118 has stored to determine which of the two buffer 436 sides to read from. The switch 434 permutation is calculated by the PEs 118 and used to route the data from the buffer 436 through the switch 434 as before. Finally, since the access to the input stream 438 for new data and the write into the buffer 436 are either performed by every PE 118 or by none of the PEs 118 at all, the actions can be enclosed in a branch. The code within the branch is only executed by every PE 118 once all the entries in one of the two buffer 436 sides have been emptied. In general, however, the software approach will typically be less efficient than the above-described hardware support.

Modifications and variations of the preferred embodiment will be readily apparent to those skilled in the art. For example, although a preferred embodiment of the present invention has been disclosed in connection with chroma keying, many other applications are of course possible. Further, although a two-valued, i.e., Boolean, condition is used in the preferred embodiment, many-valued conditional operations may be implemented in which, e.g., the condition has four possible outcomes, with four separate vectors being generated in a conditional vector output operation and four vectors consumed in a conditional vector input operation.

Also, for example, although in a preferred embodiment only one conditional vector is performed in one pass, e.g., true or false, a system which computes both true and false conditions in one pass may be implemented in accordance with an aspect of the present invention. This would entail computing separate scratchpad indices for the true and false conditions. Consequently, a dual-port scratchpad, for example, could be used so that both true and false values could be written to the same scratchpad register at different locations. Such variations are within the scope of the present invention as defined by the appended claims.

Although the present invention has been particularly described above with reference to the preferred embodiments, it should be readily apparent to those of ordinary skill in the art that the embodiments disclosed in accordance with aspects of the invention may be changed and modified in numerous ways without departing from the spirit and scope of the invention and that the invention may assume many embodiments other than the preferred embodiments specifically set out and described above.

It is therefore intended that the foregoing detailed description be understood as an illustration of the presently preferred embodiments of the invention, and not as a definition of the invention. It is only the following claims, including all equivalents, that are intended to define the scope of the invention and to cover all changes and modifications in the form and details which fall within the true spirit and scope of the invention.

What is claimed is:

1. A processor circuit for performing a distributed conditional vector input operation, the processor circuit comprising:
   means for generating a plurality of electrical signals as a condition vector representative of whether individual arithmetic clusters in a plurality of arithmetic clusters are to receive data;
   means for distributing a plurality of electrical signals as an input vector having input vector elements to arithmetic clusters in the plurality of arithmetic clusters for which a corresponding portion of the condition vector is equal to a predetermined value, a length of the condition vector being greater than a length of the input vector;
   means for using the arithmetic clusters to process the input vector elements distributed thereto; and
   means for assembling the processed input vector elements to form an output vector having a length equal to that of the condition vector.

2. The processor circuit of claim 1, wherein the corresponding portion of the condition vector comprises corresponding condition vector elements, and wherein a certain plurality of arithmetic clusters receive input vector elements as a result of corresponding condition vector elements for the certain plurality of arithmetic clusters being equal to the predetermined value.

3. A processor circuit for performing a conditional vector input operation, the processor circuit comprising:
   means for generating a plurality of electrical signals as a condition vector representative of whether individual arithmetic clusters in a plurality of arithmetic clusters are to receive data;
   means for providing a plurality of electrical signals as an input vector having input vector elements to arithmetic clusters in the plurality of arithmetic clusters for which corresponding condition vector elements of the condition vector are equal to a predetermined value, the number of clusters being greater than the number of input vector elements, the input vector elements being in one-to-one correspondence with corresponding condition vector elements of the condition vector that are equal to the predetermined value;
   means for using the arithmetic clusters to process the input vector elements provided thereto; and
   means for assembling the processed input vector elements to form an output vector.

* * * * *